United States Patent
Liu et al.

(10) Patent No.: US 12,418,721 B2
(45) Date of Patent: Sep. 16, 2025

(54) POSITION POLICY DETERMINATION FOR UNDERWATER CAMERA POSITIONING IN AN AQUACULTURE ENVIRONMENT

(71) Applicant: Aquabyte, Inc., San Francisco, CA (US)

(72) Inventors: Mochi Liu, Princeton, NJ (US);
Stephen Nuske, Pittsburgh, PA (US);
Bassem Youssef, San Jose, CA (US);
Darryl Weatherspoon, Oakland, CA (US)

(73) Assignee: Aquabyte, Inc., San Francisco, CA (US)

( * ) Notice: Subject to any disclaimer, the term of this patent is extended or adjusted under 35 U.S.C. 154(b) by 147 days.

(21) Appl. No.: 18/381,124

(22) Filed: Oct. 17, 2023

(65) Prior Publication Data
US 2025/0126360 A1   Apr. 17, 2025

(51) Int. Cl.
| A01K 29/00 | (2006.01) |
| A01K 61/80 | (2017.01) |
| A01K 61/95 | (2017.01) |
| G06T 7/50 | (2017.01) |
| H04N 23/695 | (2023.01) |

(52) U.S. Cl.
CPC ............ *H04N 23/695* (2023.01); *A01K 61/80* (2017.01); *A01K 61/95* (2017.01); *G06T 7/50* (2017.01); *G06T 2207/30242* (2013.01)

(58) Field of Classification Search
CPC ...... H04N 23/695; H04N 7/185; A01K 61/80; A01K 61/95; G06T 7/50; G06T 2207/30242
See application file for complete search history.

(56) References Cited

U.S. PATENT DOCUMENTS

| D938,687 | S | 12/2021 | Day et al. |
| 11,297,247 | B1 | 4/2022 | James et al. |
| 2017/0213070 | A1 | 7/2017 | Aghamohammadi et al. |
| 2018/0367728 | A1 | 12/2018 | Roberts et al. |
| 2020/0107524 | A1 | 4/2020 | Messana et al. |
| 2021/0274101 | A1 | 9/2021 | James et al. |
| 2023/0017422 | A1 | 1/2023 | Brentano et al. |
| 2023/0045358 | A1* | 2/2023 | Kobayashi ............ G01B 11/04 |
| 2023/0389529 | A1* | 12/2023 | Shang .................... A01K 61/85 |
| 2024/0298615 | A1* | 9/2024 | Yao ...................... H04N 23/695 |
| 2024/0425071 | A1* | 12/2024 | Lindenthal ................ G06T 7/73 |
| 2024/0428459 | A1* | 12/2024 | Brentano .................. G06T 7/80 |
| 2025/0126360 | A1* | 4/2025 | Liu ........................ A01K 61/80 |

OTHER PUBLICATIONS

International Search Report and Written Opinion, PCT App. No. PCT/US2024/050992, Dec. 23, 2024, 10 pages.

* cited by examiner

*Primary Examiner* — Howard D Brown, Jr.
(74) *Attorney, Agent, or Firm* — NICHOLSON DE VOS WEBSTER & ELLIOTT LLP

(57) ABSTRACT

A system and method involve determining a policy for positioning an underwater camera in an aquaculture environment. The system and method include receiving data on previous camera positioning actions and results, using this data to determine a new camera positioning action policy, receiving a request to choose a camera positioning action based on the new policy, determining a specific camera positioning action based on the policy, and providing the chosen action in response to the request.

20 Claims, 3 Drawing Sheets

POSITION POLICY DETERMINATION FOR UNDERWATER CAMERA POSITIONING IN AN AQUACULTURE ENVIRONMENT

BACKGROUND

The present disclosure pertains to the positioning of underwater aquaculture cameras, specifically focusing on the determination of position policies for positioning these cameras within an aquaculture environment. Each position represents a choice among various possibilities within the established position policy for an aquaculture environment. Further details are provided below.

The placement of an underwater camera within an aquaculture environment can significantly impact the quality of the images it captures, and consequently, the accuracy of information derived from those images through computer vision techniques. To illustrate, consider a scenario where an underwater camera is positioned in an aquaculture environment, such as an open sea net pen, far from the location of freely swimming aquatic organisms, such as fish. In this situation, the farmer or aqua culturist may require clear, high-quality images of these organisms to enable a computer vision system to process them accurately. These processed images are crucial for tasks like biomass estimation or determining the extent of sea lice infestations on the organisms. The camera's precise location at the time of image capture becomes critically important. If the camera is too distant from the organisms, it can hinder the computer vision system's ability to provide accurate biomass estimates or count sea lice effectively.

Techniques described herein address these and other issues.

The approaches described in the section are approaches that could be pursued, but not necessarily approaches that have been previously conceived or pursued. Therefore, unless otherwise indicated, it should not be assumed that any of the approaches described in this section qualify as prior art, or are well-understand, routine, or conventional, merely by virtue of their inclusion in this section.

BRIEF DESCRIPTION OF DRAWINGS

Embodiments and various aspects of the present disclosure are illustrated in the following detailed description and the accompanying figures. Various features shown in the figures are not drawn to scale.

DETAILED DESCRIPTION

Figure 1:
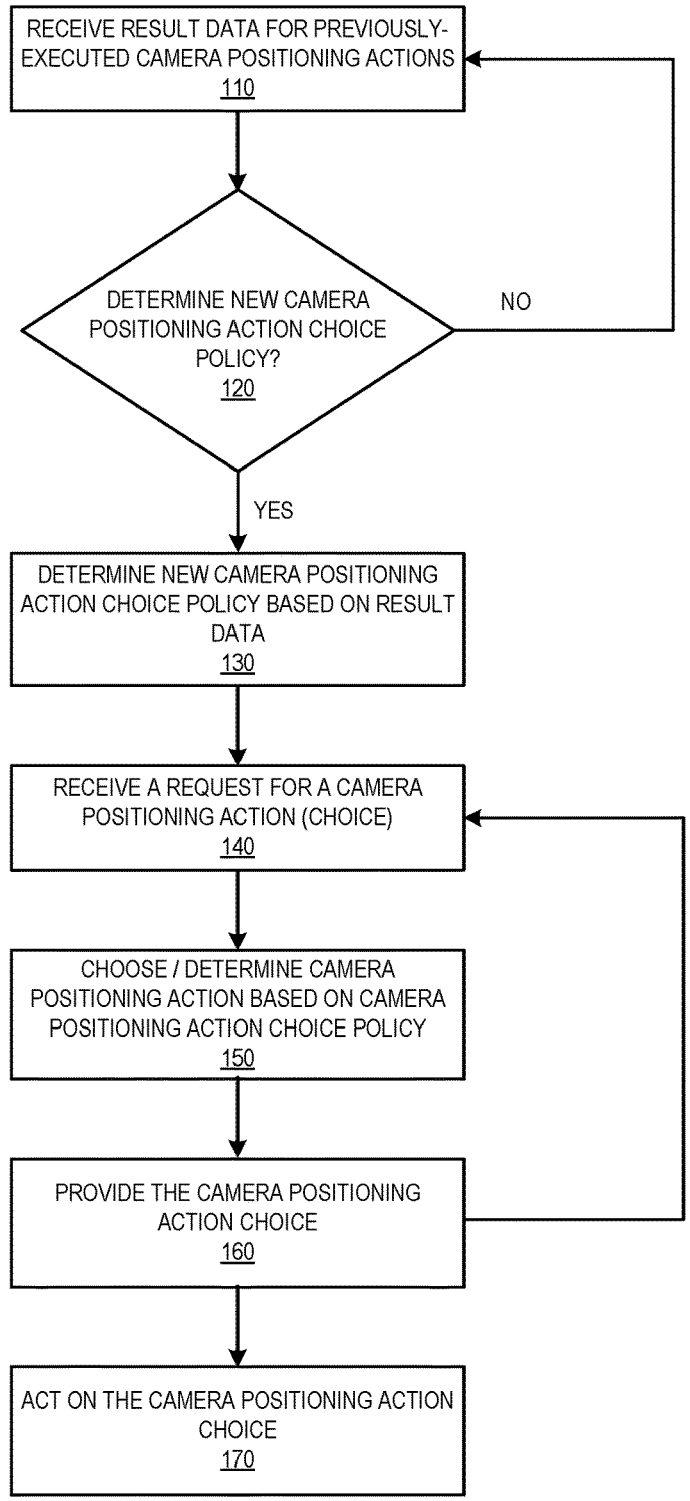
FIG. 1 illustrates an example process for camera positioning action policy determination.

In the following description, numerous specific details are provided to facilitate a comprehensive understanding of the present disclosure. However, it is evident that the present disclosure can be implemented without these specific details. Additionally, in some cases, structures and devices are presented in block diagram form to prevent undue obfuscation of the core concepts within the present disclosure.

General Overview

The positioning of an underwater camera in relation to freely swimming aquatic organisms within an underwater enclosure is of paramount importance for the effective operation of computer vision systems tasked with processing the camera-captured images for tasks such as aquatic biomass estimation or sea lice counting. Regrettably, due to the numerous challenging-to-predict variables inherent to aquaculture environments, determining the optimal camera position in advance is often an unreliable endeavor. Thus, experimentation becomes necessary. This necessity for experimentation underscores the importance of achieving successful camera positioning.

The techniques described herein strike a balance between the necessity of experimentation and the imperative for successful positioning (exploitation). This is achieved through the analysis of one or more previous camera position choices and their corresponding outcomes. With each iteration of this analysis, a new camera position policy is formulated. Within this camera position policy, every potential camera position choice is regarded as an 'action'—whether it involves exploitation or experimentation. Following the analysis, the updated position policy guides the selection of the next camera positioning action to be taken.

To illustrate the problem addressed by the techniques described herein, let's consider freely swimming fish within an open sea fish farming enclosure. A fish farmer may have several reasons for wanting to estimate the fish biomass over time, such as determining the optimal harvest time, assessing the fish's nutritional needs, optimizing the feed composition (lipids and proteins), monitoring fish health, and more. Additionally, the farmer may need to monitor the fish for sea lice infestation.

To accomplish these tasks, the farmer might employ a computer vision system capable of estimating fish biomass and counting sea lice by processing images captured by an underwater camera in the enclosure. The quality of these captured images can vary significantly based on the camera's position relative to the fish. If the images are of low quality or if the fish in view of the camera aren't representative of the entire population, the computer vision system may produce inaccurate or unreliable biomass estimates and sea lice counts.

Hence, the precise positioning of the camera within the enclosure holds immense importance. It not only affects the farmer's ability to run the fish farm effectively, potentially complying with aquaculture regulations, but also impacts camera and computer vision system providers, who rely on the trust of farmers to sell their systems. If the camera is frequently mispositioned, it can result in inaccurate biomass estimates and sea lice counts generated by the computer vision system. There may indeed be better camera positions. The techniques disclosed herein aim to enhance the utilization of known favorable camera positions while also exploring other potential positions.

The techniques disclosed herein employ a reinforcement learning approach in which multiple camera positioning actions are taken among the choices available. Each action can be associated with a known or expected outcome based on prior attempts. These anticipated results guide efforts to maximize overall outcomes while still exploring actions with less favorable expected results. Over time, a balance between exploration (selecting camera position actions with less favorable expected outcomes) and exploitation (opting for camera position actions with the best expected results) is achieved, resulting in improved outcomes and a deeper understanding of which camera positioning actions yield the best results.

The techniques involve collecting data from previous camera positioning actions. For instance, one or more camera positioning actions taken on a prior day or during a previous time period, along with the outcomes of those actions, are processed to formulate a new camera position policy for use in camera positioning on the following day or during the next time period.

Example Process for Camera Position Policy Determination

FIG. 1 illustrates the process for camera position policy determination. In brief, the process involves the following steps: Determining 130 new camera position policies based on result data received 110 within a specified time window. Receiving 140 a request for a camera positioning action. Making 150 a determination regarding which camera positioning action to select in response to the request. Providing 160 the chosen camera positioning action as a response. In some embodiments, the process may also include 170 executing the camera positioning action.

For example, let's consider the estimation of fish biomass within a fish farming enclosure using a computer vision system. The accuracy of this estimation can be influenced by the camera's position when capturing images of the fish. Process 100 can be employed to not only exploit what is believed to be the best camera positions for accurate biomass estimation but also to experiment with camera positioning.

Another example involves a computer vision system providing farmers with counts of sea lice detected on fish based on images captured by a camera. This system can identify images in which sea lice attached to fish are detected. Process 100 may be utilized to determine suitable camera positions for effective sea lice detection.

While in some examples process 100 is utilized to determine suitable camera positions for effective biomass estimation or effective sea lice detection, process 100 is utilized to determine suitable camera positions that force fish in the enclosure to swim deeper in the enclosure. Forcing fish to swim deeper using camera feedback is especially relevant for managing sea lice in salmon farming. Sea lice are more prevalent near the water surface. Encouraging salmon to swim deeper can significantly reduce their exposure to these parasites. Process 100 can be used to position the camera underwater so that the fish in the enclosure swim deeper within the enclosure where they are less exposed to sea lice and other parasites.

In many of the examples provided herein, the camera positioning actions within a camera positioning action policy consist of relative or absolute camera positions. In some embodiments, a camera positioning action may involve specifying the camera's pitch or yaw, which affects the lateral or vertical imaging direction. Examples of relative camera positions include moving the camera five feet deeper from its current depth, advancing the camera one foot forward from its current position, or rotating the camera 45 degrees from its current imaging direction, among others. Examples of absolute camera positions refer to identifiers like cubes or cuboids. In this scheme, the volume of water within the enclosure is logically subdivided into a set of cubes or cuboids, each individually addressable as a camera location through a respective identifier.

In certain embodiments, camera positioning actions may encompass more variables or offer a wider range of possibilities. For instance, they might include N absolute camera positions and M timestamps during the day, resulting in N times M total camera positioning actions. Additionally, camera positioning actions could involve a 'linger time,' representing the duration the camera remains at a current position before moving again. For example, if camera positioning actions consisted of four relative horizontal plane increments, two vertical plane increments, and offered ten possible linger times, this would yield a total of eighty camera positioning actions.

At the beginning of process 100, result data is received (110) for a camera positioning action previously undertaken. The received data may assume various forms. In some embodiments, this data may originate from another system or be received by another process, function, or entity within the same system. It might also be stored in a shared memory space, such as a database, among other possibilities.

For instance, consider a camera positioning action request system (230) that has previously requested specific camera positioning actions, such as moving to a particular cube or rotating to a specific angular orientation. The result data (110) received may indicate the outcomes of these previously executed camera positioning actions. This result data, along with the associated actions taken, could be stored in attached storage locations, such as storage 240 or 241, within the receiving systems (210, 220, or 230), or in any other suitable location.

Associating the result data received at 110 with a specific prior request may involve utilizing an attribution mechanism for previously executed camera positioning actions. This becomes crucial when there could be ambiguity regarding which camera positioning action is linked to the received result data. For instance, if system 230 repositions the camera multiple times, it might become challenging to determine which position should be attributed to any received result data at 110.

In certain embodiments, attribution is achieved by associating the result with a single camera position during a specific time period. For instance, if the camera remains in the same position for a particular duration, such as one to two hours in the morning, any high-quality images of fish captured during that time are attributed to that specific camera position. Similarly, if the camera maintains a single position throughout a specific time period during which high-quality fish images are captured, the received result data may be attributed to that position.

Figure 2:
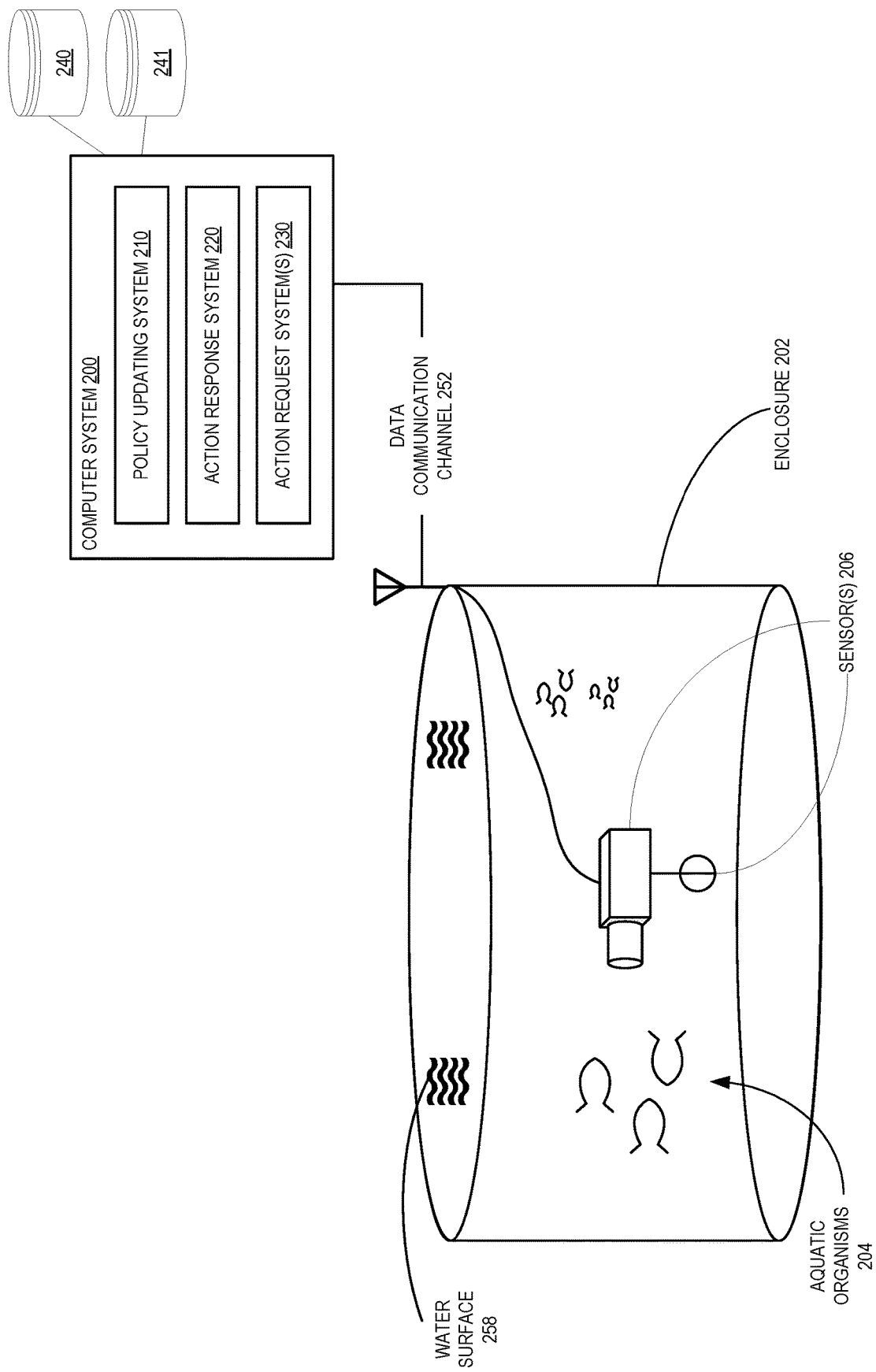
FIG. 2 illustrates an example system for camera positioning action policy determination.

Turning briefly to FIG. 2, which will be discussed in more detail below, it's important to note that the various systems—210, 220, and 230—are presented as separate entities for the sake of simplicity. In reality, two or more of these systems could be implemented within the same framework, or any of these systems might encompass multiple components.

For instance, the camera positioning action request system 230 could serve the dual purpose of requesting camera positioning actions and executing those requests. As an example, this system may function as an autonomous process that periodically checks whether high-quality fish images are being captured by the camera (e.g., every hour or two). If not, it sends a request for camera repositioning. This request could be directed to the camera positioning action response system 220, which would then respond with a proposed camera position. The actual camera repositioning may be carried out by the camera positioning system itself or through repositioning commands executed by another system (not separately depicted from the camera positioning action request system 230).

Result data (reward data) received at 110 may take one form and be stored in another. In certain embodiments, the received result data could be an indication of a camera positioning action taken (or not taken) by a camera positioning system. The stored result data might represent the action or inaction numerically or in any appropriate format.

For instance, a camera positioning policy updating system 210 (or any other system 220, 230) could receive an indication that high-quality fish images are being captured at the current camera position. Consequently, the policy updating system 210 may store an indication of '1.0' in connection with a previously executed camera positioning action. Here, '1.0' might represent the maximum (best) possible value among a range of values (e.g., between 0.0 and 1.0) representing the quality of images captured at the camera position with lower values representing lower quality images and higher values representing higher quality images. Other reward indications are possible such as, for example, the number of high-quality images captured at the current camera during a time period.

In certain embodiments, indicating the capture of low-quality images by the camera (e.g., images with no or few fish or fish positioned too far from the camera lens), which may result from an unsuccessful camera positioning action, could be associated with a low or negative outcome. Additionally, the determination of such low-quality images may involve the application of computer vision techniques to the images taken by the camera.

For example, if a machine learning-based object detection algorithm identifies fewer than a predefined threshold number of fish in a set of images captured by the camera over a specific time period, the techniques described here may classify those captured images as unsuccessful. Consequently, the camera positioning action linked to these low-quality images might be associated with a low or negative reward.

The computer vision information, such as the number of fish detected, could be received at 110 from another system or determined by the system itself (not depicted in FIG. 1).

In certain embodiments, there may exist multiple types or levels of results. Let's consider an example of a system designed for both biomass estimation and sea lice detection. If a specific camera position is suitable for one of these tasks but not the other, the result structure for the camera positioning action may be diversified or tiered based on the utility of the captured images.

For instance, when the images are suitable for both biomass estimation and sea lice detection, a value of '1.0' could be attributed to the camera positioning action. However, if the images are only suitable for one of these tasks (e.g., biomass estimation or sea lice detection), a value of '0.5' might be attributed. The attribution can vary based on the intended use of the captured images.

For example, if biomass estimation holds greater importance in aquaculture operations than sea lice detection, a value of '0.7' might be attributed to the camera positioning action when the captured images were suitable for biomass estimation but not for sea lice detection (e.g., due to most or all fish being too far from the camera lens). In contrast, a value of '0.3' could be attributed if the images were suitable for sea lice detection but not for biomass estimation (e.g., because only a few fish close to the camera lens were captured).

If the captured images were unsuitable for both biomass estimation and sea lice detection, a value of '0.0' might be assigned to the camera positioning action.

In certain embodiments, indicating a lack of fish activity in the area where the camera is currently positioned, which may be indicative of an unsuccessful camera positioning action, could be associated with a low or negative reward. Furthermore, such inactivity may be determined by a timeout mechanism.

For instance, if a camera positioning action is executed and within a specified time frame (e.g., one to two hours, a day, etc.), no or only a few useful images are captured by the camera, the techniques described here may classify the camera positioning action as unsuccessful. In such cases, the timeout may be linked to a low or negative outcome.

The timeout information might be received at 110 from another system or determined by the system itself (not depicted in FIG. 1).

As noted above, in some embodiments, low-quality images or inactivity may be attributed to a camera positioning action taken. Other result metrics that may be considered include any or all of:

The clarity of captured images may be considered as a result metric. Clear and sharp images with minimal blurriness or distortion allow for better identification and analysis of sea lice and for better identification and measurement of the fish or organisms in the aquaculture environment.

The lighting in the captured images may be considered as a result metric. Lighting in the captured images without extreme shadows or overexposure helps reveal the presence of sea lice and their characteristics and helps reveal the features and dimensions of the fish or organisms accurately.

The contrast in the captured images may be considered as a result metric. Captured images with sufficient contrast between the sea lice and the surrounding environment are beneficial for detection. Higher contrast allows for easier differentiation and segmentation of sea lice from the background.

The size of sea lice in the captured images may be considered as a result metric. Images with sea lice of varying sizes, including small and juvenile sea lice, provide a more comprehensive dataset for training or evaluating sea lice detection algorithms.

The size of the fish or organisms in the captured images may be considered as a result metric. Images with a range of sizes, including smaller and larger specimens, provide a more representative dataset for estimating the overall biomass.

The color variations of sea lice in the captured images may be considered as a result metric. Sea lice can exhibit color variations, depending on their life stages and species. Captured images that capture these color variations accurately enable better discrimination of sea lice from other objects in the aquaculture environment.

The degree of occlusion in the captured images may be considered as a result metric. Some captured images may contain occlusions, such as fish scales, nets, debris, other equipment, cleaner fish, or algae growth on the camera lens, partially covering the sea lice. Evaluating the degree of occlusion in the images can help determine the visibility and detectability of sea lice in different scenarios.

The depth and focus of the captured images may be considered as a result metric. In underwater environments, the depth and focus of the images can impact their usefulness for biomass estimation.

The background uniformity in the captured images may be considered as a result metric. Clear and focused images that capture the fish or organisms without significant blurring or loss of detail are valuable for accurate measurements. The background of the images should be relatively uniform and free from clutter, as it can interfere with biomass estimation.

The noise in the captured images may be considered as a result metric. Images with minimal noise, such as debris or bubbles, allow for better segmentation and isolation of the fish or organisms.

In certain embodiments, receiving a result at 110 may involve receiving computer vision analysis data. For instance, if a camera positioned at a specific location within the aquaculture environment captures a set of images, a computer vision system (e.g., a machine learning-based computer vision system) may analyze these captured images to determine their suitability for tasks such as sea lice detection, biomass estimation, or other aquaculture analyses.

For example, if the computer vision system determines that the captured images are of high quality and can support accurate sea lice detection or biomass estimation based on the fish or organisms depicted in these high-quality images, then the result may be received at 110 by interpreting the successful capture of high-quality images in relation to the previous camera positioning action.

In certain embodiments, the receipt of result data at 110 may be delayed or reliant on logged or recorded data. For example, computer vision analysis data pertaining to a series of camera positioning actions may be stored in one or more databases or log files, and the association of result data with specific camera positioning actions may be determined by reviewing that database or log data. The reception of such result data at 110 is delayed because it occurs after the review of the database or log data.

If the delayed or batch timing 120 has not been met, process 100 may continue collecting result data until the timing or other specified condition is satisfied (as indicated by the arrow from 120 to 110).

In certain embodiments, the delayed processing may not occur within a defined 'batch window.' This delayed processing or batch window can encompass any appropriate time period, such as one day, one hour, two hours, fifteen minutes, and so on.

In certain embodiments, meeting the batch timing at 120 may involve the passage of a specific amount of time since the conclusion of the preceding batch window. Alternatively, it may be met at specific real-world times, such as every one or two clock hours, or at specific times like 6 am, 9 am, noon, 3 pm, 6 pm, 9 pm, midnight, and so forth.

In certain embodiments, meeting the batch timing at 120 may also entail the receipt of a predetermined number of result data-camera positioning action pairs at 110. For instance, to satisfy the delayed processing timing at 120, both a specific duration of time must have elapsed, and a particular number of requests must have been received.

In certain embodiments, meeting the delayed batch timing at 120 may involve solely receiving a specific number of requests at 110, without the need for a specific duration of time to pass.

Result data for previously executed camera positioning actions may continue to be received at 110 until a delayed processing timing is met at 120. This timing could be achieved, for instance, after a twenty-four-hour period has elapsed. Prior to the meeting of this timing at 120, additional result data for previous camera positioning actions may continue to be received at 110.

If the delayed process or batch timing is met at 120, process 100 will proceed by determining a new camera positioning action policy based on the result data received during the delayed processing window.

In certain embodiments, the process of determining the new camera positioning action policy includes associating each of the received results with a camera positioning action that was taken. The matching of results with camera positioning actions may occur as part of the determination of a new camera positioning action policy, the receipt of result data at 110, or at any other point within the process 100, whether explicitly depicted or not.

In certain embodiments, the result-camera positioning action pairs within the batch (those received at 110 during the delayed processing window) may be utilized to establish the new camera positioning action policy. This may also involve considering previous camera positioning result-action pairs or prior camera positioning action policies.

In certain embodiments, an initial camera positioning action policy may be a manually designed function, and the determination of a new camera positioning action policy may be based on how well the previous camera positioning action policies performed in comparison to alternative approaches. The information used to train the camera positioning action policy may involve a combination of context, the selected camera positioning action, and the obtained result.

In certain embodiments, the information used for training is organized into a tuple represented as $t=<c, a, r>$, where 'c' denotes the context, 'a' represents the camera positioning action, and 'r' signifies the result. The camera positioning action policy is updated using a batch of N such tuples, denoted as $T=[t-1, \ldots, t-N]$. The new camera positioning action policy is subsequently generated based on the current camera positioning action policy and this batch. This learning process involves deriving the new camera positioning action policy from the previous one and the batch of tuples, T.

In certain embodiments, there exists an initial camera positioning policy denoted as 'p.' This initial policy can take various forms, such as providing a simple, even distribution or predetermined distribution over the possible camera positioning actions, being derived from log data, curated manually, seeded randomly, or adopting any suitable format. For instance, in some embodiments, logged data in the form of tuples $<c, a, r>$ can serve as the basis for initializing a multi-arm bandit. It's also possible to create an initial policy using data acquired from a different policy, provided that the logged features (contexts), actions, and results are compatible in meaning or statistics.

In certain embodiments, the determination of a new camera positioning action policy at 130 also encompasses the determination of a new camera positioning action model associated with the policy. This camera positioning action model, often referred to as 'model m,' defines the corresponding camera positioning action policy.

In certain embodiments, the camera positioning action model can take the form of a lookup table, weights, or a linear or logistic regressor, among other possibilities.

In embodiments, the camera positioning action model and camera positioning action policy are saved each time they are created or updated. This practice can be advantageous, allowing for the examination or application of these models to logged data.

In several embodiments, the camera positioning action model is the entity that is executed, while the camera positioning action policy serves to define the model. In alternative embodiments, the policy itself may be executed and utilized for the execution. For simplicity in the discussion here, the term 'policy' is used to refer to both the function used to determine which action to suggest or take based on the context and the executable model.

In certain embodiments, the process of determining a new camera positioning action policy at 130 may involve performing sampling, such as Thompson sampling, on the considered data, which includes data from the most recent batch and possibly data from previous batches. The probability distribution derived from this sampling may be based on counts or rewards, indicating how many times actions taken were successful or unsuccessful, or any appropriate measure. The sampling process can utilize a distribution, such as a Beta distribution. The use of sampling to determine the new camera positioning action policy offers advantages by striking a desirable balance between selecting camera positioning actions that provide high value (exploitation) and ensuring some distribution across all camera positioning actions (exploration).

In certain embodiments, the camera positioning action policy generated by the sampling may be intentionally diversified or subjected to further sampling to introduce variety or distribution in the suggested or executed actions, along with their relevant contexts when applicable, based on the camera positioning action policy. For example, if the sampling results in a camera positioning action policy that prescribes a specific camera position within an aquaculture environment for capturing images over a period (e.g., one hour), the policy might incorporate or later introduce a sampling mechanism that introduces variability into what the camera positioning action policy recommends. This variability could also be introduced at a different point in process 100, such as when a camera positioning action is being chosen or determined at 150.

In certain embodiments, the determination or updating of the camera positioning action policy at 130 employs an epsilon-greedy distribution. Updating the camera positioning action policy based on an epsilon-greedy algorithm involves configuring the policy to select the best camera positioning action a large percentage of the time (1-epsilon) while choosing a different camera positioning action epsilon percent of the time. The value of epsilon can vary and may be any number, such as 0.02, 0.1, 0.32, etc. The selection of other camera positioning actions (those chosen epsilon percent of the time) may involve using a random distribution among actions that do not yield the highest reward or employing any of the techniques described herein, such as sampling or upper confidence bound. In various embodiments, the camera positioning action policy may be updated using sampling in conjunction with a linear or logistic model, a deep neural network model, or any other appropriate technique or algorithm.

In certain embodiments, the determination of the new camera positioning action policy at 130 may involve the use of the upper confidence bound. Utilizing the upper confidence bound may entail updating the policy to select actions based on the upper limit of the error bound for observed rewards associated with the chosen actions. Employing the upper confidence bound to update the camera positioning action policy can be advantageous when it is essential for the policy to exhibit an optimistic approach. In cases where this optimism is justified, the camera positioning action policy will favor actions with a high potential for reward. However, when this optimism is unfounded, actions that were initially believed to yield high rewards may be selected, but as their true, lower rewards become apparent, the learning process allows the policy to adjust its preferences, accordingly, decreasing the likelihood of choosing those actions in the future. In certain embodiments, the use of the upper confidence bound to determine the new camera positioning action policy may be particularly beneficial in situations where contextual information plays a significant role in the selection of camera positioning actions.

In certain embodiments, over time, the delayed processing window will close multiple times, with each closure resulting in the determination of a new policy at 130. In many embodiments, multiple requests for camera positioning action choices are received at 140 during each delayed processing window. However, in some specific embodiments or under certain circumstances, multiple delayed processing windows may close before the next request for a camera positioning action choice is received at 140.

Receiving the request for a camera positioning action choice at 140 may involve receiving an indication that a camera positioning action choice is required. In certain embodiments, the request for a camera positioning action choice may be accompanied by context that provides crucial information about the request. This context may include any or all of the following information: results of computer vision analysis on captured images, camera position, time of day, time of year, day of the month, month, and aquaculture environment sensor information such as water salinity, oxygen saturation, turbidity, and the like.

In certain embodiments, the context may encompass telemetry data, such as the time of day, current depth, current water temperature, current dissolved oxygen levels, current water salinity, current ambient light levels, and more. Additionally, the context may comprise the results from computer vision analysis of images captured by the camera at the current camera position. These results could encompass a range of information, including but not limited to the number of fish detected, a quality score for fish detection, observed fish behaviors such as measurement density, distance to the camera, swimming direction or angle, and fish swimming speed. Furthermore, the results may also include the identification of any data collection issues, such as obstructions, occlusions, or turbidity.

Requests may be received at 140 from various sources, including applications being used by users, web pages being accessed by users, camera positioning management systems (e.g., systems that monitor the camera's status), and similar sources. For instance, requests for camera positioning action choices may be received at 140 through a system like the camera positioning action request system 230 depicted in FIG. 2, either on behalf of a user utilizing an application to confirm their choice of a camera positioning action or on behalf of a system (e.g., a biomass estimation system or a sea lice detection system) that has determined that the current camera position is not capturing images of sufficiently high quality.

After receiving the request for a camera positioning action choice at 140, a camera positioning action choice may be determined at 150 in response to the request. The determination of a camera positioning action choice for the request can involve utilizing the context associated with the request along with the most recent camera positioning action policy (or the camera positioning action model associated with the most recent camera positioning action policy). For example, if a request for repositioning the camera from its current low-quality position has been received at 140, the most recently determined camera positioning action policy may be employed to decide at 150 the appropriate camera positioning action for the received request. This decision might entail repositioning the camera to a lower depth within the fish farming enclosure while adjusting the pitch of the camera lens to point more towards the water surface.

In some embodiments, camera positioning action choices are determined immediately, while in others, they are determined in batches, potentially with some delay from the time the request is received. For instance, when a new camera position is confirmed by a fish farm operator before actual repositioning takes place, the determination at 150 is made promptly so that the camera positioning action can be promptly displayed to the user. In scenarios where it's feasible to consolidate responses to requests, camera positioning actions might be determined at scheduled intervals (e.g., once per hour or day), and all pending requests received during that period can be processed together using the same camera positioning action model.

As discussed elsewhere in this document, in some embodiments, determining camera positioning action choices based on received requests at 140 may involve introducing variability into the camera positioning action policy (or model). For instance, if a camera positioning action model, which implements a camera positioning action policy, utilizes coefficients within a vector representing elements of the context in the request, these coefficients can be subject to sampling to introduce variability in the determinations made at 150 using the camera positioning action model. This sampling can be advantageous in scenarios where the determinations of new camera positioning action policies are batched, as the policy may remain unchanged for many determinations made in response to received requests. Sampling can be achieved by introducing small, random variations to the coefficients.

After the camera positioning action choice is determined at 150, it may be provided in response to the original request received at 140. This response can be provided by sending it to the requester, writing the camera positioning action to data storage, or through any other suitable method. Responses may be directed to the original requester or to a system or device responsible for acting on the requests. For instance, one system may identify that images captured at the current camera position are of low quality and send related requests, with the camera positioning actions being provided to another system responsible for scheduling and executing those actions.

In some embodiments, a ranking of multiple camera positioning actions will be determined at 150 in response to the original request received at 140. This ranking of camera positioning actions may involve assessing the expected reward for each of these actions and ordering them accordingly based on their expected rewards.

In some embodiments, each camera positioning action corresponds to sets of rules, which can be computationally or temporally expensive to evaluate. In such cases, the requesting system may ask for an ordered list (ranked list) of camera positioning actions. This enables the requester to evaluate the rules associated with the camera positioning actions in the provided order at a lower computational or temporal cost, thereby benefiting the requester.

In some embodiments, there is an optional step of acting on the camera positioning action choice (as depicted in FIG. 1). This may involve carrying out the action that was determined in step 150 and provided in step 160. Various embodiments involve changes in the camera positioning action policy over time based on new data related to camera positioning actions performed and observed rewards. This can be advantageous, as compared to other techniques, because the needs addressed by the camera positioning action policy may change over time. For instance, a certain pattern of camera positioning actions may be prevalent during the winter months when there is less sunlight, while a different pattern of camera positioning actions may be observed during the summer months when there is more sunlight.

In some embodiments, after the camera positioning action has been determined, the camera positioning action may be carried out.

Example System for Camera Positioning Action Policy Determination

FIG. 2 depicts an example computer system 200 for camera positioning action policy determination. The system 200 shown in FIG. 2 represents one embodiment of a system that can be used for camera positioning action policy determination. Other systems, whether simpler or more complex, can also be employed. For instance, the system may consist of various scripts or programs that execute on any of the systems shown in the diagram or on systems not illustrated. The update of the camera positioning action policy, as described in this document, might be executed by a policy updating system 210, or by another system like 220 or 230, or by another device or system not shown in FIG. 2. Additionally, requests for camera positioning action choices could be received from system 230, which may either generate such requests or act on behalf of other systems or devices (not displayed in FIG. 2) to send requests. It's important to note that while camera positioning action response system 220 is shown separately from camera positioning policy updating system 210, in some embodiments, these two systems may be one and the same. Furthermore, although all systems 210-230 and storage 240-241 are displayed as separate entities, connected through a network, some implementations might merge two or more of these components into a single system, server, or program.

Figure 3:
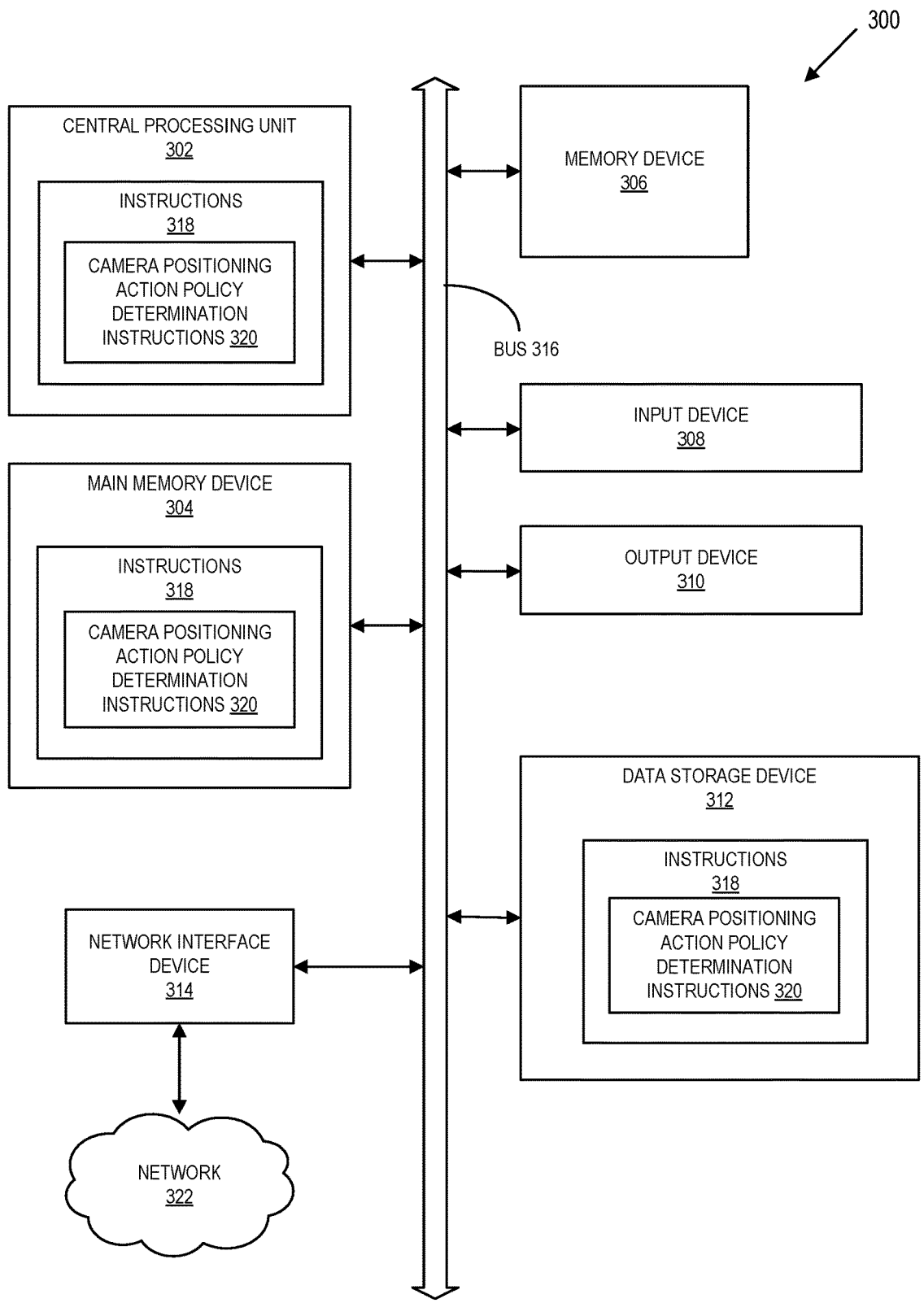
FIG. 3 illustrates an example of a programmable electronic device that processes and manipulates data to perform tasks and calculations disclosed herein for camera positioning action policy determination.

In certain embodiments, the process 100 outlined in FIGS. 1 and 2 can be executed on the system 200 depicted in FIG. 2 and/or the hardware 300 shown in FIG. 3. For instance, the functions described in process 100 can be carried out by one or more of systems 210-230. Each of these systems 210-230 may operate on a single computing device, multiple computing devices, in a distributed manner across a network, or on one or more virtual machines running on computing devices. In certain embodiments, systems 210-230 represent distinct sets of processes running on separate computing devices. However, in other embodiments, these systems may be intertwined, share processes or functions, and/or operate on the same computing devices. Additionally, in some scenarios, storage 240 and 241 are connected to systems 210-230 via a network or another connection. Storage 240 and 241 may also be part of or integrated with one or more of systems 210-230.

As discussed herein, the various processes, including process 100, may run in parallel, in conjunction with each other, or one process may be a subprocess of another. Furthermore, any of these processes may be executed on the systems or hardware discussed herein.

FIG. 2 also illustrates an example aquaculture environment in which system 200 can be utilized. This environment consists of an aquatic organism enclosure 202, aquatic organisms 204, and a set of one or more sensors 206.

Enclosure 202 can be framed by a plastic or steel cage, providing a substantially conical, cubic, cylindrical, spherical, or hemispherical shape. Enclosure 202 can house aquatic organisms 204 of a specific type, such as Atlantic salmon or other fish species farmed for food. The maximum number of aquatic organisms 204 that can be held may vary depending on factors such as the size of enclosure 202 and the maximum stocking density of the particular type of aquatic organism being farmed. For instance, an enclosure 202 designed for Atlantic salmon could have dimensions of 50 meters in diameter and 20-50 meters in depth, capable of holding approximately 200,000 salmon, assuming a maximum stocking density of 10 to 25 kg/m3. While enclosure 202 could be a net pen or sea-cage located in the open sea or open water, it could also be a fish farm pond, tank, or another type of fish farm enclosure.

Set of sensors 206 can include a monocular or stereo vision underwater camera immersed within enclosure 202. The underwater camera utilizes visible light to capture images or video of freely moving aquatic organisms 204 within enclosure 202. These captured images or videos provide pixel information to computer vision system 200, which then extracts and analyzes quantitative data for object recognition using computer vision techniques.

No specific type or configuration of underwater camera is required. For instance, the underwater camera can be a 12-megapixel color or monochrome camera with a resolution of approximately 4096×3000 pixels and a frame rate ranging from 1 to 8 frames per second. Different underwater cameras with varying capabilities can be used as per the specific requirements of the implementation.

The selection of the underwater camera's lens is crucial, and it should be based on an appropriate baseline and focal length. This ensures that the camera captures images of aquatic organisms 204 within enclosure 202 as they move in front of the lens. These organisms should be close enough to the lens for proper pixel resolution and feature detection in the captured image but far enough away from the lens to fit entirely within a single image or video frame. For instance, an 8-millimeter focal length lens with a high line pair count (lp/mm) can be used to ensure pixel resolution. The baseline of the underwater camera can have some variability, ranging from 6 to 12 millimeters, for example.

The underwater camera serves the purpose of capturing images or video of various objects submerged within enclosure 202. These objects may include farmed aquatic organisms 204, pests (e.g., sea lice), uneaten feed pellets, predators that have breached enclosure 202, algae, or other invasive organisms, among others. The captured images or video are then transmitted as sensor data over data communication channel 252 to system 200 or another computer vision system for analysis. The computer vision techniques employed can be based on machine learning, such as one or more convolutional neural networks trained to extract specific features from the input images or video recorded by the underwater camera.

The analysis performed by the computer vision techniques serves various purposes. For instance, the analysis carried out by system 200's computer vision techniques can encompass tasks such as biomass estimation of aquatic organisms 204, growth analysis of aquatic organisms 204, feed conversion analysis, sea lice detection or counting, uneaten feed pellet detection or counting, motion analysis of aquatic organisms 204 for health or disease assessment, or other environmental analysis based on images or video captured by the underwater camera.

Sensors 206 can encompass one or more additional sensors designed for use both below the water surface at 258 within enclosure 202 and above the water surface. An underwater sensor can measure various underwater environmental conditions in enclosure 202, including water temperature, dissolved oxygen, salinity, chlorophyll levels, blue-green algae presence, turbidity, colored dissolved organic matter, and other relevant parameters. Conversely, sensors 206 can also include one or more above-water sensors positioned at or near the water surface at 258 or enclosure 202. These above-water sensors can measure air temperature, wind speed, wind direction, barometric pressure, relative humidity, or other pertinent above-water environmental conditions.

Measurement data resulting from measurements taken by either an underwater sensor or an above-water sensor can be transmitted to system 200 via data communication channel 252. For instance, individual measurements or aggregated data collected by these sensors can be sent to system 200 as time series data, either in real-time or periodically in batches.

An underwater sensor can be either attached to the underwater camera or securely affixed to enclosure 202 beneath the water surface at 258. Conversely, an above-water sensor can be securely attached to enclosure 202 above the water surface at 258. Any sensor, whether it's the underwater camera, another underwater sensor, or an above-water sensor, can establish communication with system 200 through data communication channel 252.

Data communication channel 252 may utilize one or more suitable wired or wireless data communication technologies, such as ETHERNET, USB, FIREWIRE, CAN-BUS, or other wired data communication technologies, as well as 2G, 3G, 4G, 5G, LTE, WI-FI, WIMAX, BLUETOOTH, satellite-based, or other wireless data communication technologies.

While system 200 is depicted outside of enclosure 202 in FIG. 1, it is possible for some or all of system 200 to be implemented within one or more of sensors 206 (for example, within the underwater camera equipped with computing capabilities). Additionally, it is feasible for some or all of system 200 to be implemented through a non-sensor computing appliance attached to or affixed to enclosure 202.

Some or all of system 200 can also be implemented remotely from enclosure 202, potentially on a nearby barge or boat, within a data center, or another computing hosting facility (e.g., in the "cloud"). Furthermore, some or all of system 200 can be integrated into a feed system.

The underwater camera can be attached to a winch system (not depicted). This winch system enables the underwater camera to be repositioned underwater within enclosure 202, facilitating the capture of images or videos of aquatic organisms 204 from various locations and depths within the enclosure. For instance, the winch allows the underwater camera to move along the perimeter of enclosure 202 and at different depths within it. Furthermore, the winch or a separate device may provide control over the pan and tilt of the underwater camera.

The winch can be operated manually by a human controller, for example, by providing user input to a winch control system located above the water surface at 258. Alternatively, or in addition, the winch can function autonomously based on a winch control program designed to adjust the camera's underwater position within enclosure 202. Such a winch control program could utilize the camera position action policy determination techniques described in this document.

The autonomous winch control system is capable of altering the underwater camera's location based on a series of predefined or pre-programmed adjustments or in response to signals detected within enclosure 202. These signals may indicate better or more optimal locations for capturing images or videos of aquatic organisms 204 relative to the camera's current position or orientation.

Various signals can be employed, such as machine learning and computer vision techniques applied to images or videos captured by the underwater camera. These techniques can be used to detect schools or clusters of aquatic organisms 204 that are currently distant from the underwater camera. This allows the determination of a location closer to the school or cluster, with subsequent adjustments to the location, tilt, or pan of the underwater camera to capture more suitable images of aquatic organisms 204.

The same or different techniques can be employed to automatically ascertain whether the underwater camera should continue to remain in its current location or orientation. This decision is based on the camera being in a favorable position to capture suitable images of aquatic organisms 204.

Instead of relying on the winch to reposition the underwater camera within enclosure 204, the housing of the underwater camera can incorporate underwater propulsion mechanisms, such as propellers or water jets. In such a scenario, the underwater camera can autonomously navigate within enclosure 202, essentially operating in a self-driving manner. Additionally, in this setup, the underwater camera can include components and software for autonomous navigation control, such as underwater LiDAR and computer vision software.

While the underwater camera can operate using natural light, an ambient lighting apparatus can be attached to the underwater camera or positioned within enclosure 202. For instance, this lighting apparatus can illuminate a volume of water in front of the underwater camera lens with ambient lighting in the blue-green spectrum (450 nanometers to 570 nanometers). This spectrum extends the duration of the daily sampling period during which valuable images of aquatic organisms 204 within enclosure 202 can be captured.

For example, depending on the current season (e.g., winter), time of day (e.g., sunrise or sunset), and the latitude of enclosure 202, only a few hours in the middle of the day may be suitable for capturing useful images without the use of ambient lighting. The application of ambient lighting can extend this daily period. The use of fluorescent, LED, or other artificial lighting is also feasible.

Example Programmable Electronic Device

FIG. 3 illustrates an example of a programmable electronic device that processes and manipulates data to perform tasks and calculations disclosed herein for domain-specific named entity extraction. Example programmable electronic device 300 includes central processing unit (CPU) 302, main memory device 304, memory device 306, input device 308, output device 310, data storage device 312, and network interface device 314 all connected to bus 316. While only one of each type of device connected to the bus 316 is depicted in FIG. 3 for the purpose of providing a clear example, multiple instances of each of one or more of these devices may be connected to bus 316. Further, some devices may not be present in a particular instance of device 300. For example, device 300 in a headless configuration such as, for example, when operating as a server racked in a data center may not be connected to or include input device 308 or output device 310.

CPU 302 interprets and executes instructions 318 including instructions 320 for domain-specific named entity extraction. CPU 302 may fetch, decode, and execute instructions 318 from main memory device 304. CPU 302 performs arithmetic and logic operations and coordinates the activities of other hardware components of device 300. CPU 302 may include a cache used to store frequently accessed data and instructions 318 to speed up processing. CPU 302 may have multiple layers of cache (L1, L2, L3) with varying speeds and sizes. CPU 302 may be composed of multiple cores which each such core is a processing unit within CPU 302. The cores allow CPU 302 to execute multiple instructions 318 at once in a parallel processing manner. CPU 302 may support multi-threading where each core of CPU 302 can handle multiple threads (multiple sequences of instructions) at once to further enhance parallel processing capabilities. CPU 302 may be made using silicon wafers according to a manufacturing process (e.g., 7 nm, 5 nm). CPU 302 can be configured to understand and execute a set of commands referred to as an instruction set architecture (ISA) (e.g., x86, x86_64, or ARM).

Main memory device 304 (sometimes referred to as "main memory" or just "memory") holds data and instructions 318 that CPU 302 uses or processes. Main memory device 304 provides the space for the operating system, applications, and data in current use to be quickly reached by CPU 302. Main memory device 304 may be a random-access memory (RAM) device that allows data items to be read or written in substantially the same amount of time irrespective of the physical location of the data items inside the main memory device 304.

Main memory device 304 can be a volatile or non-volatile memory device. Data stored in a volatile memory device is lost when the power is turned off. Data in a non-volatile memory device remains intact even when the system is turned off. For example, main memory device 304 can be a Dynamic RAM (DRAM) device. A DRAM device such as a Single Data Rate RAM (SDRAM) device or Double Data Rate RAM (DDRAM) is a volatile memory device that stores each bit of data in a separate capacitor within an integrated circuit. The capacitors leak charge and need to be periodically refreshed to avoid information loss. Additionally, or alternatively, main memory device 304 can be a Static RAM (SRAM) device. A SRAM device is a volatile memory device that is typically faster but more expensive than DRAM. SRAM uses multiple transistors for each memory cell but does not need to be periodically refreshed. Additionally, or alternatively, a SRAM device may be used for cache memory in CPU 302.

Device 300 can have memory device 306 other than main memory device 304. Examples of memory device 306 include a cache memory device, a register memory device, a read-only memory (ROM) device, a secondary storage device, a virtual memory device, a memory controller device, and a graphics memory device.

A cache memory device may be found inside or very close to CPU 302 and is typically faster but smaller than main memory device 304. A cache memory device may be used to hold frequently accessed data and instructions 318 to speed up processing. A cache memory device is usually hierarchical ranging from a Level 1 cache memory device which is the smallest but fastest cache memory device and is typically inside CPU 302 to Level 2 and Level 3 cache memory devices which are progressively larger and slower cache memory devices that can be inside or outside CPU 302.

A register memory device is a small but very fast storage location within CPU 302 designed to hold data temporarily for ongoing operations.

A ROM device is a non-volatile memory device that can only be read, not written to. For example, a ROM device can be a Programmable ROM (PROM) device, an Erasable PROM (EPROM) device, or an electrically erasable PROM (EEPROM) device. A ROM device may store basic input/output system (BIOS) instructions which help device 300 boot up.

A secondary storage device is a non-volatile memory device. For example, a secondary storage device can be a hard disk drive (HDD) or other magnetic disk drive device;

a solid-state drive (SSD) or other NAND-based flash memory device; an optical drive like a CD-ROM drive, a DVD drive, or a Blu-ray drive; or flash memory device such as a USB drive, an SD card, or other flash storage device.

A virtual memory device is a portion of a hard drive or an SSD that the operating system uses as if it were main memory device 304. When main memory device 304 gets filled, less frequently accessed data and instructions 318 can be "swapped" out to the virtual memory device. The virtual memory device is slower than main memory device 304, but it provides the illusion of having a larger main memory device 304.

A memory controller device manages the flow of data and instructions 318 to and from main memory device 304. A memory control device can be located either on the motherboard of device 300 or within CPU 302.

A graphics memory device is used by a graphics processing unit (GPU) (not shown) and is specially designed to handle the rendering of images, videos, and graphics. Examples of a graphics memory device include a graphics double data rate (GDDR) device such as a GDDR5 device and a GDDR6 device.

Input device 308 is an electronic component that allows users to feed data and control signals into device 300. Input device 308 translates a user's action or the data from the external world into a form that device 300 can process. Examples of input device 308 include a keyboard, a pointing device (e.g., a mouse), a touchpad, a touchscreen, a microphone, a scanner, a webcam, a joystick/game controller, a graphics tablet, a digital camera, a barcode reader, a biometric device, a sensor, and a MIDI instrument.

Output device 310 is an electronic component that conveys information from device 300 to the user or to another device. The information can be in the form of text, graphics, audio, video, or other media representation. Examples of an output device 310 include a monitor or display device, a printer device, a speaker device, a headphone device, a projector device, a plotter device, a braille display device, a haptic device, a LED or LCD panel device, a sound card, and a graphics or video card.

Data storage device 312 may be an electronic device that is used to store data and instructions 318. Data storage device 312 may be a non-volatile memory device. Examples of data storage device 312 include a hard disk drive (HDD), a solid-state drive (SDD), an optical drive, a flash memory device, a magnetic tape drive, a floppy disk, an external drive, or a RAID array device. Data storage device 312 could additionally or alternatively be connected to device 300 via network 322. For example, data storage device 312 could encompass a network attached storage (NAS) device, a storage area network (SAN) device, or a cloud storage device.

Network interface device 314 (sometimes referred to as a network interface card, NIC, network adapter, or network interface controller), is an electronic component that connects device 300 to network 322. Network interface device 314 functions to facilitate communication between device 300 and network 322. Examples of a network interface device 314 include an ethernet adaptor, a wireless network adaptor, a fiber optic adapter, a token ring adaptor, a USB network adaptor, a Bluetooth adaptor, a modem, a cellular modem or adapter, a powerline adaptor, a coaxial network adaptor, an infrared (IR) adapter, an ISDN adaptor, a VPN adaptor, and a TAP/TUN adaptor.

Bus 316 is a communication system that transfers data between electronic components of device 300. Bus 316 serves as a shared highway of communication for data and instructions (e.g., instructions 318), providing a pathway for the exchange of information between components within device 300 or between device 300 and another device. Bus 316 connects the different parts of device 300 to each other. Examples of bus 316 include a system bus, a front-side bus, a data bus, an address bus, a control bus, an expansion bus, a universal serial bus (USB), a I/O bus, a memory bus, an internal bus, and an external bus.

Instructions 318 are computer-executable instructions that can take different forms. Instructions 318 can be in a low-level form such as binary instructions, assembly language, or machine code according to an instruction set (e.g., x86, ARM, MIPS) that CPU 302 is designed to execute. Instructions 318 can include individual operations that CPU 302 is designed to perform such as arithmetic operations (e.g., add, subtract, multiply, divide, etc.); logical operations (e.g., AND, OR, NOT, XOR, etc.); data transfer operations including moving data from one location to another such as from main memory device 304 into a register of CPU 302 or from a register to main memory device 304; control instructions such as jumps, branches, calls, and returns; comparison operations; and specialization operations such as handling interrupts, floating-point arithmetic, and vector and matrix operations. Instructions 318 can be in a higher-level form such as programming language instructions in a high-level programming language such as Python, Java, C++, etc. Instructions 318 can be in an intermediate level form in between a higher-level form and a low-level form such as bytecode or an abstract syntax tree (AST).

Instructions 318 for execution by CPU 302 can be in different forms at the same or different times. For example, when stored in data storage device 312 or main memory device 304, instructions 318 for execution by CPU 302 may be stored in a higher-level form such as Python, Java, or other high-level programing language instructions, in an intermediate-level form such as Python or Java bytecode that is compiled from the programming language instructions, or in a low-level form such as binary code or machine code. When stored in CPU 302, instructions 318 for execution by CPU 302 may be stored in a low-level form. However, instructions 318 for execution by CPU 302 may be stored in CPU 302 in an intermediate level form where CPU 302 can execute instructions in such form.

Network 322 is a collection of interconnected computers, servers, and other programmable electronic devices that allow for the sharing of resources and information. Network 322 can range in size from just two connected devices to a global network (e.g., the internet) with many interconnected devices. Individual devices on network 322 are sometimes referred to as "network nodes." Network nodes communicate with each other through mediums or channels sometimes referred to as "network communication links." The network communication links can be wired (e.g., twisted-pair cables, coaxial cables, or fiber-optic cables) or wireless (e.g., Wi-Fi, radio waves, or satellite links). Network 322 may encompass network devices such as routers, switches, hubs, modems, and access points. Network nodes may follow a set of rules sometimes referred to "network protocols" that define how the network nodes communicate with each other. Example network protocols include data link layer protocols such as Ethernet and Wi-Fi, network layer protocols such as IP (Internet Protocol), transport layer protocols such as TCP (Transmission Control Protocol), application layer protocols such as HTTP (Hypertext transfer Protocol) and HTTPS (HTTP Secure), and routing protocols such as OSPF (Open Shortest Path First) and BGP (Border Gateway Protocol). Network 322 may have a particular physical or logical layout or arrangement sometimes referred to as a "network topology." Example network topologies include bus, star, ring, and mesh. Network 322 can be different of different sizes and scopes. For example, network 322 can encompass some or all of the following categories of networks: a personal area network (PAN) that covers a small area (a few meters), like a connection between a computer and a peripheral device via Bluetooth; a local area network (LAN) that covers a limited area, such as a home, office, or campus; a metropolitan area network (MAN) that covers a larger geographical area, like a city or a large campus; a wide area network (WAN) that spans large distances, often covering regions, countries, or even globally (e.g., the internet); a virtual private network (VPN) that provides a secure, encrypted network that allows remote devices to connect to a LAN over a WAN; an enterprise private network (EPN) build for an enterprise, connecting multiple branches or locations of a company; or a storage area network (SAN) that provides specialized, high-speed block-level network access to storage using high-speed network links like Fibre Channel.

As used herein, the term "computer-readable media" refers to one or more mediums or devices that can store or transmit information in a format that a computer system can access. Computer-readable media encompasses both storage media and transmission media. Storage media includes volatile and non-volatile memory devices such as RAM devices, ROM devices, secondary storage devices, register memory devices, memory controller devices, graphics memory devices, and the like.

The term "non-transitory computer-readable media" as used herein refers to computer-readable media as just defined but excluding transitory, propagating signals. Data stored on non-transitory computer-readable media isn't just momentarily present and fleeting but has some degree of persistence. For example, instructions stored in a hard drive, a SSD, an optical disk, a flash drive, or other storage media are stored on non-transitory computer-readable media. Conversely, data carried by a transient electrical or electromagnetic signal or wave is not stored in non-transitory computer-readable media when so carried.

Terminology

As used herein and in the appended claims, unless otherwise clear in context, the terms "comprising," "having," "containing," "including," "encompassing," "in response to," "based on," etc. are intended to be open-ended in that an element or elements following such a term is not meant to be an exhaustive listing of elements or meant to be limited to only the listed element or elements.

Unless otherwise clear in context, relational terms such as "first" and "second" are used herein and in the appended claims to differentiate one thing from another without limiting those things to a particular order or relationship. For example, unless otherwise clear in context, a "first device" could be termed a "second device." The first and second devices are both devices, but not the same device.

Unless otherwise clear in context, the indefinite articles "a" and "an" are used herein and in the appended claims to mean "one or more" or "at least one." For example, unless otherwise clear in context, "in an embodiment" means in at least one embodiment, but not necessarily more than one embodiment.

As used herein, unless otherwise clear in context, the term "or" is open-ended and encompasses all possible combinations, except where infeasible. For example, if it is stated that a component may include A or B, then, unless infeasible or otherwise clear in context, the component may include at least A, or at least B, or at least A and B. As a second example, if it is stated that a component may include A, B, or C then, unless infeasible or otherwise clear in context, the component may include at least A, or at least B, or at least C, or at least A and B, or at least A and C, or at least B and C, or at least A and B and C.

Unless the context clearly indicates otherwise, conjunctive language in this description and in the appended claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

Unless the context clearly indicates otherwise, the relational term "based on" is used in this description and in the appended claims in an open-ended fashion to describe a logical or causal connection or association between two stated things where one of the things is the basis for or informs the other without requiring or foreclosing additional unstated things that affect the logical or casual connection or association between the two stated things.

Unless the context clearly indicates otherwise, the relational term "in response to" is used in this description and in the appended claims in an open-ended fashion to describe a stated action or behavior that is done as a reaction or reply to a stated stimulus without requiring or foreclosing additional unstated stimuli that affect the relationship between the stated action or behavior and the stated stimulus.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

Unless the context clearly indicates otherwise, the term "or" is used in the foregoing description and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, the terms "comprising," "including," "having," "based on," "encompassing," and other like terms, are used in the foregoing description and in the appended claims in an open-ended fashion, and do not exclude additional elements, features, acts, or operations.

Unless the context clearly indicates otherwise, conjunctive language in the foregoing description and in the appending claims such as the phrase "at least one of X, Y, and Z," is to be understood to convey that an item, term, etc. can be either X, Y, or Z, or a combination thereof. Thus, such conjunctive language is not intended to require by default implication that at least one of X, at least one of Y, and at least one of Z to each be present.

Unless the context clearly indicates otherwise, as used in the foregoing description and in the appended claims, the singular forms "a," "an," and "the" are intended to include the plural forms as well.

Unless the context clearly indicates otherwise, in the foregoing description and in the appended claims, although the terms first, second, etc. are, in some instances, used herein to describe various elements, features, acts, or operations, these features, acts, or operations should not be limited by these terms. These terms are only used to distinguish one element, feature, act, or operation from another. For example, a first computing device could be termed a second computing device, and, similarly, a second computing device could be termed a first computing device. The first computing device and the second computing device are both computing devices, but they are not the same computing device.

What is claimed is:

1. A computer-implemented method for camera positioning action choice policy determination for positioning an underwater camera in an aquaculture environment, the method performed by one or more computing devices, the method comprising:
  receiving result data for camera positioning actions taken as a first set of camera positioning action result data, wherein the camera positioning actions were chosen based on a previous version of a camera positioning action choice policy, and wherein the previous version of the camera positioning action choice policy was determined at least in part based on a previous set of result data for a previous set of camera positioning actions taken;
  determining a new camera positioning action choice policy based at least in part on (1) the first set of camera positioning action result data, and (2) one or more of the previous set of result data for the previous set of camera positioning actions taken or the previous version of the camera positioning action choice policy;
  receiving a request to choose a camera positioning action from among camera positioning actions in the new camera positioning action choice policy;
  determining a particular camera positioning action to take based at least in part on the new camera positioning action choice policy; and
  providing the particular camera positioning action to be taken in response to the request.

2. The computer-implemented method of claim 1, further comprising performing a camera positioning action of the determined particular camera positioning action.

3. The computer-implemented method of claim 1, further comprising:
  receiving multiple requests wherein each request of the multiple requests is for choice of camera positioning action to be taken; and
  determining one or more corresponding camera positioning arm actions to be taken in response to each request, of the multiple requests, based at least in part on the new camera positioning action choice policy.

4. The computer-implemented method of claim 1, wherein determining the particular camera positioning action to be taken based at least in part of the new camera positioning action choice policy comprises using statistical variance in the new camera positioning action choice policy during the determining.

5. The computer-implemented method of claim 1, wherein receiving reward data for camera positioning actions taken comprises receiving first reward data for a first camera positioning action, wherein the first reward data was determined based on passage of a particular timeout period after the first camera positioning action was taken.

6. The computer-implemented method of claim 1, further comprising determining multiple, ranked camera positioning actions to take in response to the received request.

7. The computer-implemented method of claim 6, further comprising: choosing which camera positioning action to take based at least in part on ranking of the multiple, ranked camera positioning actions.

8. The computer-implemented method of claim 1, wherein:
  the set of camera positioning action-result data comprises first context data for the camera positioning actions taken; and
  the new camera positioning action choice policy is determined based at least in part on the first set of camera positioning action-result data that includes the first context data for the camera positioning actions taken.

9. A system for camera positioning action choice policy determination for positioning an underwater camera in an aquaculture environment, the system comprising:
  one or more computing devices;
  memory;
  instructions, stored in the memory, and which when executed by the system, cause the system to perform:
    receiving result data for camera positioning actions taken as a first set of camera positioning action result data, wherein the camera positioning actions were chosen based on a previous version of a camera positioning action choice policy, and wherein the previous version of the camera positioning action choice policy was determined at least in part based on a previous set of result data for a previous set of camera positioning actions taken;
    determining a new camera positioning action choice policy based at least in part on (1) the first set of camera positioning action result data, and (2) one or more of the previous set of result data for the previous set of camera positioning actions taken or the previous version of the camera positioning action choice policy;
    receiving a request to choose a camera positioning action from among camera positioning actions in the new camera positioning action choice policy;
    determining a particular camera positioning action to take based at least in part on the new camera positioning action choice policy; and
    providing the particular camera positioning action to be taken in response to the request.

10. The system of claim 9, further comprising instructions, stored in the memory, and which when executed by the system, cause the system to perform: performing a camera positioning action of the determined particular camera positioning action.

11. The system of claim 9, further comprising instructions, stored in the memory, and which when executed by the system, cause the system to perform:
  receiving multiple requests wherein each request of the multiple requests is for choice of camera positioning action to be taken; and
  determining one or more corresponding camera positioning arm actions to be taken in response to each request, of the multiple requests, based at least in part on the new camera positioning action choice policy.

12. The system of claim 9, wherein determining the particular camera positioning action to be taken based at least in part of the new camera positioning action choice policy comprises using statistical variance in the new camera positioning action choice policy during the determining.

13. The system of claim 9, wherein receiving reward data for camera positioning actions taken comprises receiving first reward data for a first camera positioning action, wherein the first reward data was determined based on passage of a particular timeout period after the first camera positioning action was taken.

14. The system of claim 9, further comprising instructions, stored in the memory, and which when executed by the system, cause the system to perform: determining multiple, ranked camera positioning actions to take in response to the received request.

15. The system of claim 14, further comprising instructions, stored in the memory, and which when executed by the system, cause the system to perform choosing which camera positioning action to take based at least in part on ranking of the multiple, ranked camera positioning actions.

16. The system of claim 9, wherein:
the set of camera positioning action-result data comprises first context data for the camera positioning actions taken; and
the new camera positioning action choice policy is determined based at least in part on the first set of camera positioning action-result data that includes the first context data for the camera positioning actions taken.

17. One or more non-transitory computer-readable media storing instructions for camera positioning action choice policy determination for positioning an underwater camera in an aquaculture environment, the instructions, when executed by a set of one or more programmable electronic devices, cause the set of one or more programmable electronic devices to perform:
receiving result data for camera positioning actions taken as a first set of camera positioning action result data, wherein the camera positioning actions were chosen based on a previous version of a camera positioning action choice policy, and wherein the previous version of the camera positioning action choice policy was determined at least in part based on a previous set of result data for a previous set of camera positioning actions taken;
determining a new camera positioning action choice policy based at least in part on (1) the first set of camera positioning action result data, and (2) one or more of the previous set of result data for the previous set of camera positioning actions taken or the previous version of the camera positioning action choice policy;
receiving a request to choose a camera positioning action from among camera positioning actions in the new camera positioning action choice policy;
determining a particular camera positioning action to take based at least in part on the new camera positioning action choice policy; and
providing the particular camera positioning action to be taken in response to the request.

18. The one or more non-transitory computer-readable media of claim 17, wherein the instructions, when executed by the set of one or more programmable electronic devices, further cause the set of one or more programmable electronic devices to perform performing a camera positioning action of the determined particular camera positioning action.

19. The one or more non-transitory computer-readable media of claim 17, wherein the instructions, when executed by the set of one or more programmable electronic devices, further cause the set of one or more programmable electronic devices to perform:
receiving multiple requests wherein each request of the multiple requests is for choice of camera positioning action to be taken; and
determining one or more corresponding camera positioning arm actions to be taken in response to each request, of the multiple requests, based at least in part on the new camera positioning action choice policy.

20. The one or more non-transitory computer-readable media of claim 17, wherein the instructions, when executed by the set of one or more programmable electronic devices, further cause the set of one or more programmable electronic devices to perform: using statistical variance to determine the new camera positioning action choice policy.

* * * * *